(12) United States Patent
Sakurai et al.

(10) Patent No.: US 7,355,645 B2
(45) Date of Patent: Apr. 8, 2008

(54) IMAGE PICKUP APPARATUS WITH POTENTIAL FLUCTUATION PREVENTION

(75) Inventors: Katsuhito Sakurai, Tokyo (JP); Toru Koizumi, Kanagawa (JP); Hiroki Hiyama, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 897 days.

(21) Appl. No.: 10/190,713

(22) Filed: Jul. 9, 2002

(65) Prior Publication Data

US 2003/0011831 A1    Jan. 16, 2003

(30) Foreign Application Priority Data

Jul. 12, 2001    (JP)    ............................. 2001-212301

(51) Int. Cl.
*H04N 5/335*    (2006.01)
(52) U.S. Cl. ...................................... 348/308
(58) Field of Classification Search ................ 348/308, 348/301, 310, 302
See application file for complete search history.

(56) References Cited

U.S. PATENT DOCUMENTS 5,406,332 A * 4/1995 Shinohara et al. .......... 348/308
6,727,946 B1 * 4/2004 Zhao et al. ................. 348/308
6,784,931 B1 * 8/2004 Kudo ......................... 348/296
6,795,121 B2 * 9/2004 Matsunaga et al. ......... 348/308
6,963,371 B2 * 11/2005 Sakurai et al. .............. 348/301
2002/0001038 A1 * 1/2002 Lee ............................ 348/308

FOREIGN PATENT DOCUMENTS

| JP | 4-342305 | 11/1992 |
| JP | 09-247538 | 9/1997 |
| JP | 2000-077642 | 3/2000 |

OTHER PUBLICATIONS

Official Action from Chinese Patent Office dated Aug. 6, 2004, in Chinese Application No. 02140650.2.
U.S. Appl. No. 09/783,556, filed Feb. 15, 2001.

* cited by examiner

*Primary Examiner*—Lin Ye
*Assistant Examiner*—Nicholas G Giles
(74) *Attorney, Agent, or Firm*—Fitzpatrick, Cella, Harper & Scinto

(57) ABSTRACT

There is provided an image pickup apparatus including a pixel including a photoelectric conversion element and an amplification element for amplifying and outputting a signal generated at the photoelectric conversion element, a load transistor for controlling an electric current flowing at the amplification element, and a potential control element for suppressing potential fluctuation in a first main electrode region of the load transistor which is an output side of the amplification element.

12 Claims, 11 Drawing Sheets

IMAGE PICKUP APPARATUS WITH POTENTIAL FLUCTUATION PREVENTION

BACKGROUND OF THE INVENTION

1. Field of the Invention

The present invention relates to a solid-state image pickup apparatus broadly used in image input devices of, for example, video cameras, digital still cameras, and image scanners.

2. Related Background Art

In recent years, in order to achieve higher resolution, reduction of the cell size of photoelectric conversion elements using miniaturization processes is being pursued vigorously, but the accompanying loss of photoelectric conversion signal output has drawn attention to amplification type solid-state image pickup apparatuses capable of amplifying and outputting photoelectric conversion signals. Such amplification-type solid-state image pickup apparatuses include MOS-type, AMI, CMD, BASIS and the like. Among these, the MOS-type accumulates an optical carrier generated at a photodiode in a gate electrode, and based on a drive timing from a scan circuit, performs electric charge amplification to output the potential change to an output portion. In recent years, among the MOS-types, attention is being given particularly to a CMOS-type solid-state image pickup apparatus where the whole configuration including the photoelectric conversion portion and its peripheral circuitry is formed using CMOS processes.

FIG. 12 shows a block diagram of a conventional CMOS-type solid-state image pickup apparatus. In FIG. 12, reference numeral 1 denotes a pixel portion, reference numeral 2 denotes a vertical scanning circuit block for performing vertical scanning, symbols D11-D33 denote photodiodes, symbols M211-M233 denote reset MOSs for resetting electric charges of the photodiodes, symbols M311-M333 denote amplifications MOSs for amplifying the electric charges of the photodiodes, symbols M411-M433 denote selection MOSs for selecting the rows, symbols V1-V3 denote vertical signal lines, reference numerals M51-M53 denote load MOSs serving as loads of the amplification MOSs, symbol M50 denotes an input MOS for setting a constant current flown to the load MOSs, and reference numeral 5 denotes a voltage input terminal for setting a gate voltage of the input MOS.

Below, explanation will be made of the operation. When light enters the photodiodes D11-D33, photo-signal charges are generated and accumulated. The reading of the signals is performed by the vertical shift resistor 2 which vertically scans rows to read out signals to the vertical scanning lines V1-V3 in sequence on a row basis. First, when the first row is selected, PSEL connected to the gates of the selection MOSs M411-M431 changes to a high level, and the amplification MOSs M311-M331 become active. As a result, the signals from the first row are read out to the vertical signal lines V1-V3. Next, PRES 1 connected to the gates of the reset MOSs M211-M231 changes to a high level and the electric charges accumulated in the photodiodes D11-D31 are reset. Next, the second row is selected and the signals of the second row are similarly read out to the vertical signal lines V1-V3. The third and subsequent rows are similarly read out sequentially to the vertical signal lines V1-V3.

However, according to the above-mentioned reading operation, the greater the photo-signal becomes, the lower the voltages of the vertical signal lines V1-V3 become. Further, since the vertical signal lines V1-V3 are connected to the drains of the load MOSs M51-M53, the electric current values of the load MOSs change due to a channel length modulation effect of the MOS transistors when the voltages on the vertical signal lines change. Therefore, the electric current flowing to a common GND line 4 during read-out of a certain row changes depending on the number of pixels into which light enters, or depending on the amount of light that has entered them.

On the other hand, due to limitations of chip size and the like, the GND line 4 can only have a line width of a limited value, and thus it has a certain impedance. Further, since the value of the constant current flowing to the load MOS is set by applying an input voltage 5 between the gate of the input MOS M50 and an absolute GND (for example, a ground potential of an external board), the value of the set current changes due to a voltage drop that is determined by the impedance of the GND line 4 and the current that is flowing. Therefore, the greater the number of pixels into which light enters becomes, or the greater the amount of incident light becomes, the less the voltage drop in the GND line 4 becomes and the greater the set current of the load MOS becomes.

On the other hand, due to limitations of chip size and the like, the GND line 4 can only have a line width of a limited value, and thus it has a certain impedance. Further, since the value of the constant current flowing to the load MOS is set by applying an input voltage 5 between the gate of the input MOS M50 and an absolute GND (for example a ground potential of an external board), the value of the set current changes due to a voltage drop that is determined by the impedance of the GND line 4 and the current that is flowing. Therefore, the greater the number of pixels into which light enters becomes, or the greater the amount of incident light becomes, the less the voltage drop in the GND line 4 becomes and the greater the set current of the load MOSS becomes.

In a case where a strong light has entered only some of pixels in a given row, the current value of the load MOSs increases also in pixels where the light does not enter (i.e., dark pixels), and thus the voltage between the gate and the source of its amplification MOS increases. This phenomenon causes the output voltages of the dark pixels to differ between rows which include pixels where strong light enters and rows which do not, and thus there is a problem that a whitish strip occurs on the left and right of a spot on an image upon which a strong spot light is made incident. Further, in a solid-state image pickup apparatus having an optical black (OB) pixel, the output voltages from the dark pixels and the OB pixels differ between a line which includes pixels into which strong light enters and a line which does not, and thus a similar problem described above occurred.

SUMMARY OF THE INVENTION

An object of the present invention is to obtain an image of high quality.

In order to attain the above object, there is provided an image pickup apparatus comprising:

a pixel including a photoelectric conversion element and an amplification element arranged to amplify and output a signal generated in the photoelectric conversion element;

a load transistor arranged to control an electric current flowing at the amplification element; and a potential control element arranged to suppress potential fluctuation in a first main electrode region of the load transistor which is an output side of the amplification element.

Further, according to another aspect of the present invention, there is provided an image pickup apparatus comprising:

a pixel including a photoelectric conversion element and an amplification element arranged to amplify and output a signal generated in the photoelectric conversion element;

a load transistor arranged to control an electric current flowing in the amplification element;

a control transistor which is connected serially to a first main electrode of the load transistor which is an output side of the amplification element; and a drive circuit arranged to apply a constant first voltage to a control electrode region of the control transistor, both during a period when the signal is being read out from the amplification element and during a period when the signal is not being read out from the amplification element.

Other objects and characteristics of the present invention will become apparent from the description of embodiments of the present invention given hereinbelow.

DESCRIPTION OF THE PREFERRED EMBODIMENTS

First Embodiment

Figure 1:
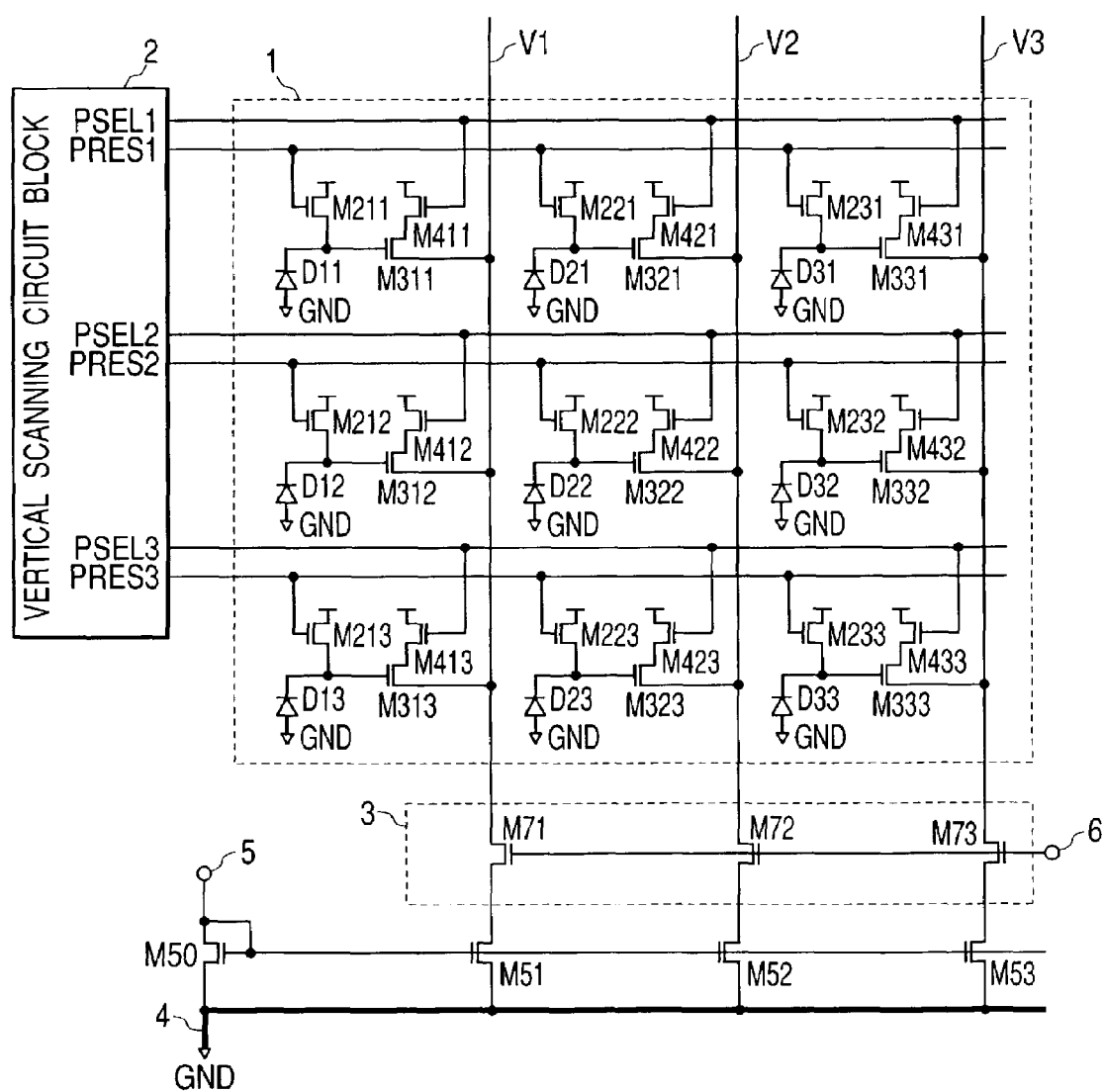
FIG. 1 is a block diagram of a solid-state image pickup apparatus illustrating a first embodiment of the present invention.

FIG. 1 is a block diagram of a first embodiment of a solid-state image pickup apparatus according to the present invention. The circuit elements constituting the solid-state image pickup apparatus are not particularly restricted by manufacturing techniques of semiconductor integrated circuits, but the elements are formed on a single semiconductor substrate such as a monocrystal silicon. Further, for simplicity, the invention is configured in FIG. 1 as having a pixel array of 3 rows and 3 columns, but the invention is not restricted to this size.

A construction of the solid-state image pickup apparatus of the present embodiment will now be explained using FIG. 1. In the present example, photodiodes D11-D33 for generating photo-signal charges are grounded on their anode sides. The cathode sides of the photodiodes D11-D33 are connected to the gates of amplification MOSs M311-M333. Further, the sources of reset MOSs M211-M233 for resetting the amplification MOSs M311-M333 are connected to the gates of the amplification MOSs M311-M333, and the drains of the reset MOSs M211-M233 are connected to reset power supplies. Further, the drains of the amplification MOSs M311-M333 are connected to selection MOSs M411-M433 for supplying supply voltages. The gate of the reset MOS M211 is connected to a first row selection line (vertical scanning line) PRES 1 arranged so as to extend along a horizontal direction. The gates of similar reset MOSs M221 and M231 in the other pixel cells that are arranged in the same row are commonly connected to the first row selection line PRES1 as well. The gate of the selection MOS M411 is connected to a second row selection line (vertical scanning line) PSEL1 arranged so as to extend along the horizontal direction. Gates of similar selection MOSs M421 and M431 in other pixel cells arranged in the same row are commonly connected to the second row selection line PSEL1 as well. The first and the second row selection lines are connected to a vertical scanning circuit block 2 and are supplied with signal voltages based on an operation timing which is described later. The remaining lines shown in FIG. 1 are also provided with similarly constructed pixel cells and row selection lines. PRES2-PRES3 and PSEL2-PSEL3 formed in the vertical scanning circuit block 2 are provided as these row selection lines.

The source of the amplification MOS M311 is connected to a vertical signal line V1 arranged so as to extend along a vertical direction. Sources of similar amplification MOSs M312 and M313 in the pixel cells arranged in the same column are also connected to the vertical signal line V1. The vertical signal line V1 is connected to a load MOS M51 serving as a load element, via a gate-grounded MOS M71 serving as a constant voltage means 3. The gate of the MOS M71 is connected to a voltage input terminal 6 for supplying a gate voltage. The remaining vertical signal lines V2-V3 shown in FIG. 1 similarly have amplification MOSs, gate-grounded MOSs and load MOSs connected to them. Further, the sources of the load MOSs M51-M53 are commonly connected to a GND line 4, and their gates are connected to a gate of an input MOS M50 and to a voltage input terminal 5.

Next, operation will be explained. When light enters the photodiodes D11-D33, photo-signal charges are generated and accumulated. The reading of the signals is performed by the vertical shift resistor 2 which vertically scans one row after the other, and the signals are read out sequentially to the vertical signal lines V1-V3. First, when the first row is selected, the PSEL1 connected to the gates of the selection MOSs M411-M431 changes to a high level and the amplification MOSs M311-M331 become active. As a result, the signals from the first row are read out by the vertical signal lines V1-V3. Next, the PRES1 connected to the gates of the reset MOSs M211-M231 changes to a high level and resets the electric charges accumulated in the photodiodes D11-D31. Next, the second row is selected and the signals from the second row are read out similarly to the vertical signal lines V1-V3. The third row and subsequent rows are similarly read out sequentially by the vertical signal lines V1-V3.

When for example the first row is read out in accordance with the above-mentioned operation, even if there are changes in the signal voltages read out to the vertical signal lines V1-V3, the drain voltages of the load MOSs M51-M53 do not change since they are determined by the source voltages of the gate-grounded MOSs M71-M73. Therefore, even in a case where extremely large signal charges are read out, the electric current values from the load MOSs M51-M53 can be maintained with little change. Therefore, since neither the number of pixels into which light has entered nor the amount of light received cause changes in the voltage drop amount of the GND line 4, the set currents of the load MOSs M51-M53 are maintained at their fixed levels, regardless of which line is read. In accordance with the above-mentioned construction, output voltages from dark pixels (and from OB pixels) are equal between a row which includes pixels into which intense light enters and a row which does not, and thus a problem of a whitish strip occurring in an image upon which a strong spot light is made incident does not occur, thereby enabling a clear image to be obtained.

Second Embodiment

Figure 2:
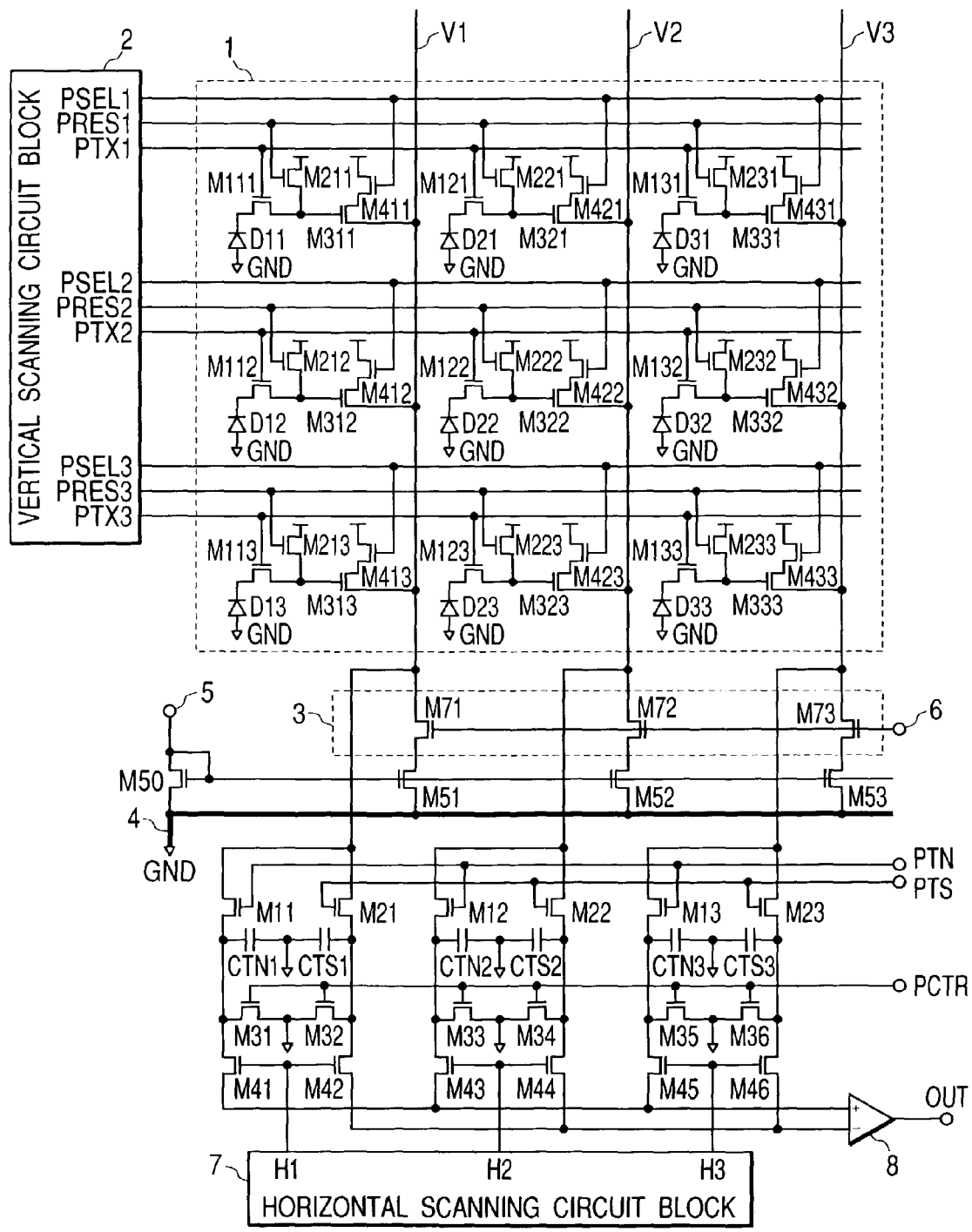
FIG. 2 is a block diagram of a solid-state image pickup apparatus illustrating a second embodiment of the invention.

FIG. 2 is a block diagram of a second embodiment of the solid-state image pickup apparatus according to the present invention. A pixel portion 1 in the second embodiment is constituted by adding to the first embodiment, transfer MOSs M111-M133 for sending the photo-signal charges accumulated in the photodiodes, between the cathode sides of the photodiodes D11-D33 and the gates of the amplification MOSs M311-M333.

The gate of the transfer MOS M111 is connected to a third row selection line (vertical scanning line) PTX1 arranged so as to extend along the horizontal direction. The gates of similar transfer MOSs M121 and M131 in the other pixel cells arranged in the same row are commonly connected to the third row selection line as well. The third row selection line is connected to the vertical scanning circuit block 2 similarly to the first and the second row selection lines, and it is supplied with a signal voltage based on an operation timing which is described later. The pixel portion other than what is described above is similar to FIG. 1, and the same reference numerals are assigned to the same construction elements.

Further, the vertical signal line V1 is connected via a noise-signal transfer switch M11 to a capacitor CTN1 for temporarily holding a noise signal, and is similarly connected via a photo-signal transfer switch M21 to a capacitor CTS1 for temporarily holding a photo-signal. Terminals on the opposite sides of the noise-signal holding capacitor CTN1 and the photo-signal holding capacitor CTS1 are grounded. A connecting point of the noise-signal transfer switch M11 and the noise-signal holding capacitor CTN1, and a connecting point of the photo-signal transfer switch M21 and the photo-signal holding capacitor CTS1, are grounded through holding-capacitor reset switches M31 and M32, respectively, and are also connected via horizontal transfer switches M41 and M42 to a differential circuit block 8 for obtaining a difference between the photo-signal and the noise signal.

The gates of the horizontal transfer switches M41 and M42 are commonly connected to a column selection line H1, and are connected to a horizontal scanning circuit block 7. The remaining columns V2-V3 shown in FIG. 2 are also provided with reading circuits having similar constructions. Further, the gates of the noise-signal transfer switches M11-M13 and the photo-signal transfer switches M21-M23 connected to each of the columns are commonly connected to PTN and PTS, respectively, and are each provided with signal voltages based on an operation timing described later.

Figure 3:
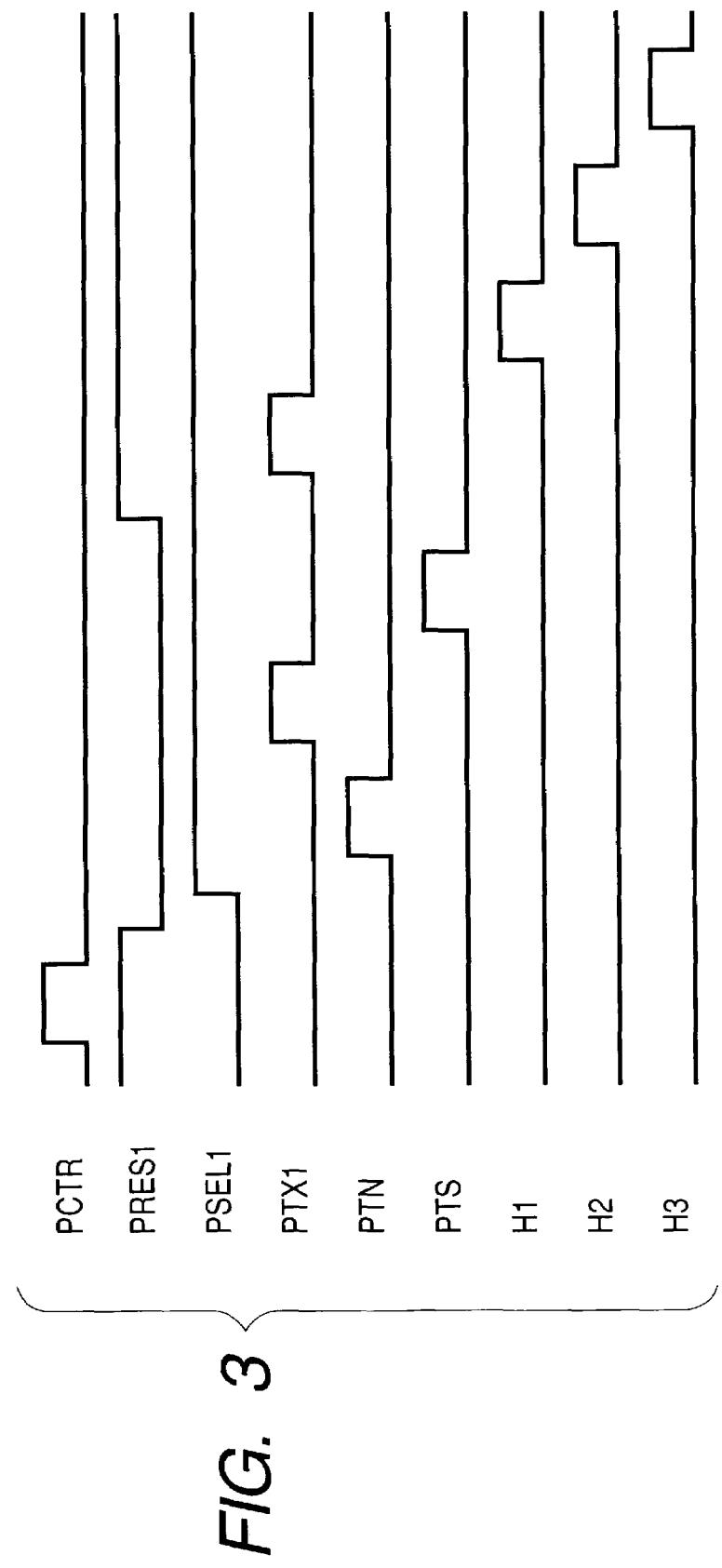
FIG. 3 is a timing chart for explaining operation of the second embodiment of the invention.

Next, explanation will be made of operation of the present embodiment, making reference to FIG. 3. When the photo-signal charges are to be read out from the photodiodes D11-D33, the PRES1 connected to the gates of the reset MOSs M211-M231 changes to a high level. As a result, the gates of the amplification MOSs M311-M331 are reset to the reset power supply. After the PRES1 connected to the gates of the reset MOSs M211-M231 returns to the low level, the PSEL1 connected to the gates of the selection MOSs M411-M431 and the PTN connected to the gates of the noise-signal transfer switches M11-M13 change to a high level. Accordingly, reset signals (noise signals) with the reset noise superimposed thereon are read to the noise-signal holding capacitors CTN1-CTN3. Next, the PTN connected to the gates of the noise-signal transfer switches M11-M13 returns to a low level.

Next, the PTX1 connected to the gates of the transfer MOSs M111-M131 changes to a high level, and the photo-signal charges in the photodiodes D11-D33 are sent to the gates of the amplification MOSs M311-M331. After the PTX1 connected to the gates of the transfer MOSs M11-M131 returns to the low level, the PTS connected to the gates of the photo-signal transfer switches M21-M23 changes to a high level. As a result, the photo-signals are read out to the photo-signal holding capacitors CTS1-CTS3. Next, the PTS connected to the gates of the photo-signal transfer switches M21-M23 returns to a low level. In the operations up until this point, the noise signals and the photo-signals from the pixel cells connected to the first row are being held in the noise-signal holding capacitors CTN1-CTN3 and the photo-signal holding capacitors CTS1-CTS3 which are connected to each of the columns.

Next, the PRES1 connected to the gates of the reset MOSs M211-M231 and the PTX1 connected to the gates of the transfer MOSs M111-M131 change to high level, and the photo-signal charges in the photodiodes D11-D33 are reset. After that, signals H1-H3 from the horizontal scanning circuit block 7 cause the gates of the horizontal transfer switches M41-M46 of each column to change to high level sequentially, and the voltages that were being held in the noise-signal holding capacitors CTN1-CTN3 and the photo-signal holding capacitors CTS1-CTS3 are read out sequentially to the differential circuit block. At the differential circuit block, the difference between the photo-signals and the noise signals is obtained, and this is outputted sequentially to an output terminal OUT. Thus, the reading of the pixel cells connected to the first row is completed.

After that, before the reading of the second row, the PCTR connected to the gates of the reset switches M31-M36 of the noise-signal holding capacitors CTN1-CTN3 and the photo-signal holding capacitors CTS1-CTS3 changes to a high level, and the capacitors are reset by being grounded. The subsequent operation is similar, such that the signals of the pixel cells connected to the second and subsequent rows are read out sequentially by means of the signals from the vertical scanning circuit block, and thus the reading of all the pixel cells is completed.

When, for example, the first row is read out in accordance with the above-mentioned operation, even if there are changes in the signal voltages read out to the vertical signal line V1-V3, the drain voltages of the load MOSs M51-M53 do not change since they are determined by the source voltages of the gate-grounded MOSs M71-M73. Therefore, even in a case where extremely large signal charges are read out, the electric current values from the load MOSs M51-M53 can be maintained with little change. Therefore, since neither the number of pixels into which light enters nor the amount of light received cause changes in the voltage drop amount of the GND line 4, the set currents of the load MOSs M51-M53 are maintained at their fixed levels, regardless of which line is read.

In accordance with the above-mentioned construction, output voltages of dark pixels (and from OB pixels) are equal between a row which includes pixels into which intense light enters and a row which does not, and thus a problem of a whitish strip occurring in an image upon which a strong spot light is made incident does not occur, thereby enabling a clear image to be obtained.

Third Embodiment

Figure 4:
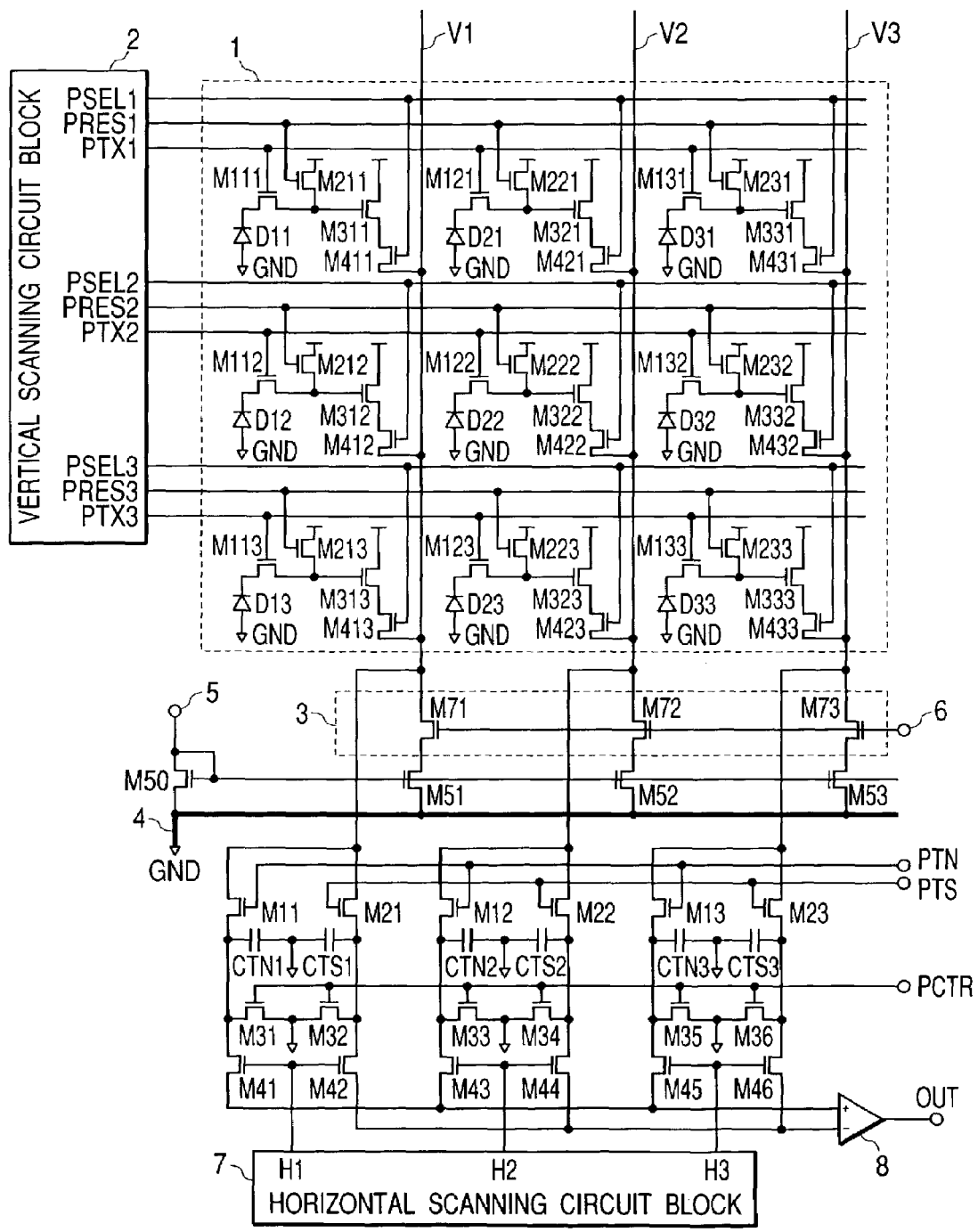
FIG. 4 is a block diagram of a solid-state image pickup apparatus illustrating a third embodiment of the invention.

FIG. 4 is a block diagram of a third embodiment of the solid-state image pickup apparatus according to the present invention. In the present embodiment the construction of the pixel portion 1 is different from the aforementioned embodiments. In the present embodiment, the drains of the amplification MOSs M311-M333 are directly connected to the power supply. The source of the amplification MOS M311 is connected via the selection MOS M411 to the vertical signal line V1 arranged so as extend along the vertical direction. The sources of similar amplification MOSs M312 and M313 in other pixel cells arranged in the same column are also connected to the vertical signal line V1 via selection MOSs M412 and M413. The remaining vertical signal lines V2-V3 shown in FIG. 4 also have amplification MOSs and selection MOSs connected to them similarly.

The operation according to the present embodiment is similar to the second embodiment and has the same effects.

Fourth Embodiment

Figure 5:
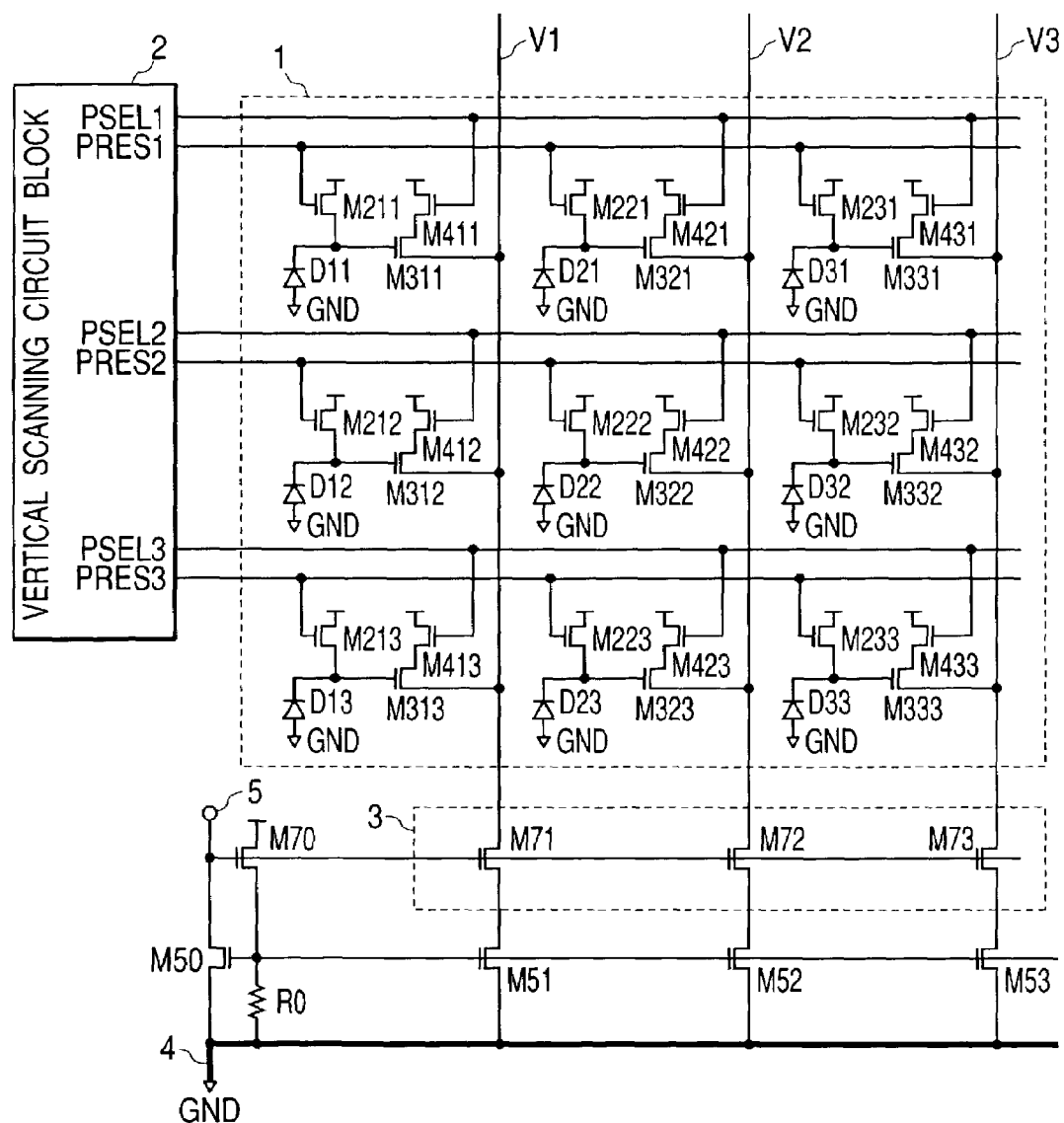
FIG. 5 is a block diagram of a solid-state image pickup apparatus illustrating a fourth embodiment of the invention.

FIG. 5 is a block diagram of a fourth embodiment of the solid-state image pickup apparatus according to the present invention. The construction of the constant voltage means 3 is different from the first embodiment, so that in accordance with the present construction, it is not necessary to independently provide the gate voltages of the gate-grounded MOSs M71-M73 and the gate voltage of the input MOS M50 which sets the constant current for the load.

Fifth Embodiment

Figure 6:
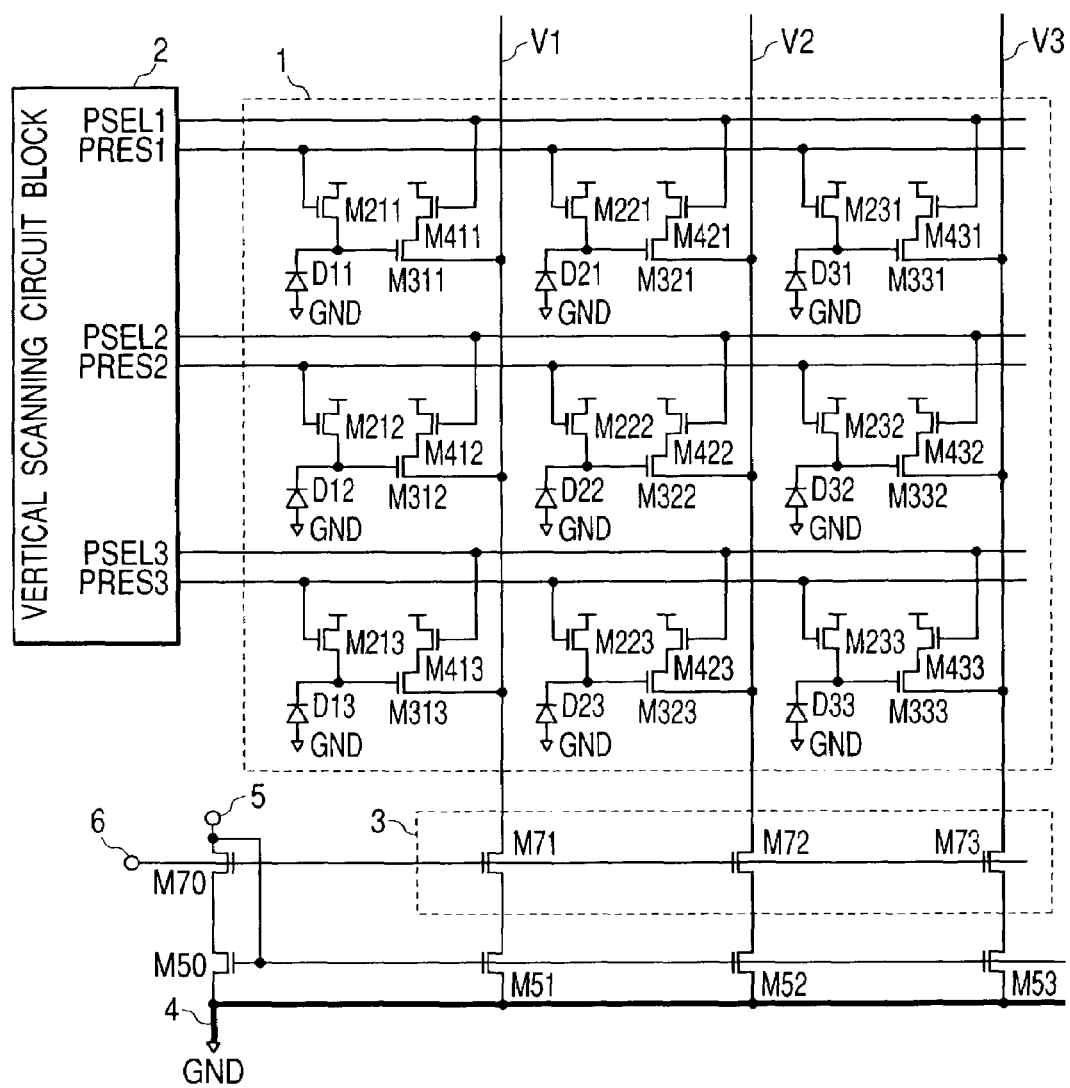
FIG. 6 is a block diagram of a solid-state image pickup apparatus illustrating a fifth embodiment of the invention.

FIG. 6 is a block diagram of a fifth embodiment of the solid-state image pickup apparatus according to the present invention. In accordance with the present embodiment, the construction of the constant voltage means 3 is different from the first embodiment.

Sixth Embodiment

Figure 7:
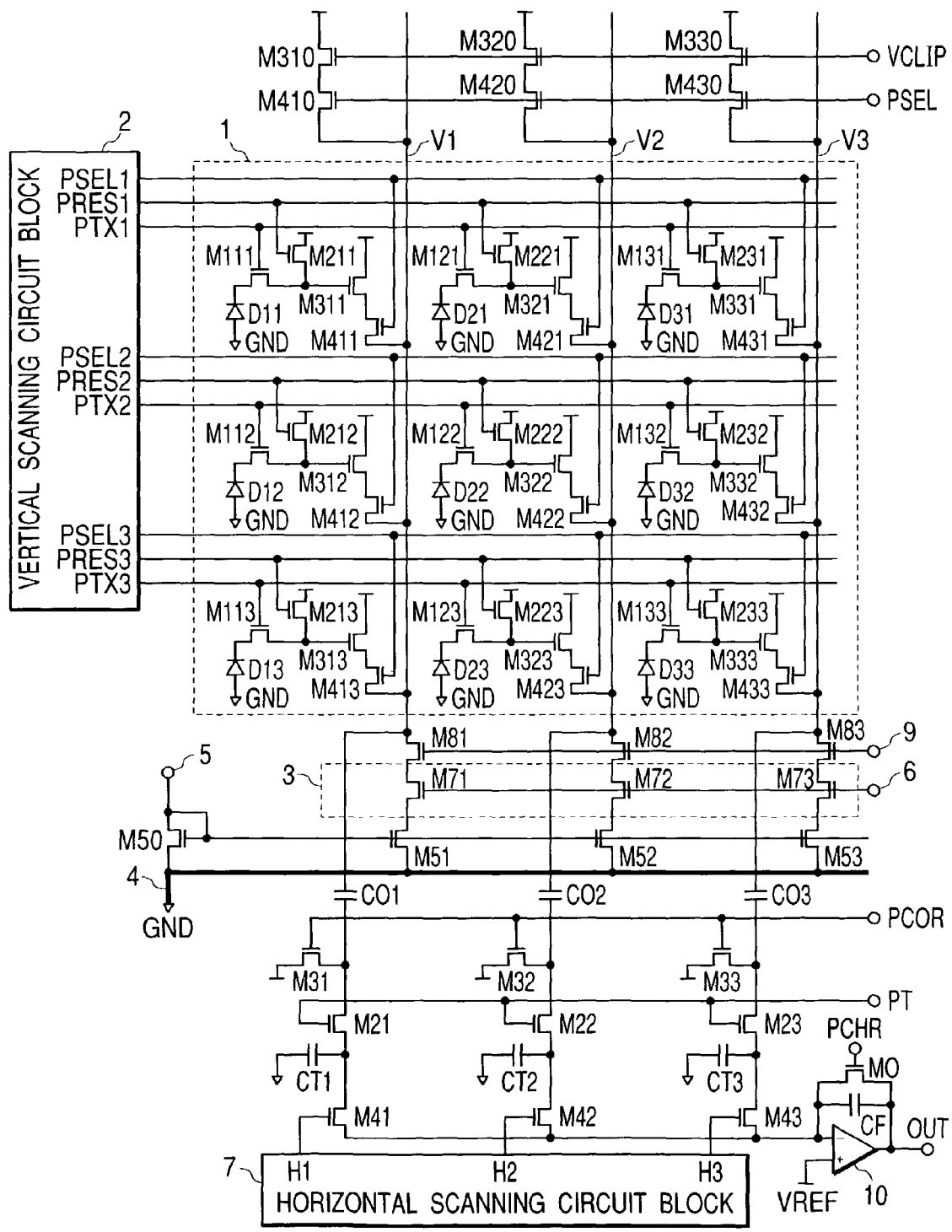
FIG. 7 is a block diagram of a solid-state image pickup apparatus illustrating a sixth embodiment of the invention.

FIG. 7 is a block diagram of a sixth embodiment of the solid-state image pickup apparatus according to the present invention. The pixel portion 1 of the present embodiment has a similar construction to the third embodiment. The vertical signal line V1 is connected to a switch M81 for separating the vertical signal line V1 from the load, and to a load MOS M51 serving as a load element, via a gate-grounded MOS M71. Further, the vertical signal line V1 is connected to a clip transistor M310 via a switch M410 for controlling a clip operation. The remaining vertical signal lines V2-V3 shown in FIG. 7 are also connected with amplification MOSs, switches, gate-grounded MOSs, load MOSs, clip transistors and control switches. The gates of the switches M81-M83 and the gates of the gate-grounded MOSs M71-M73 are commonly connected to a control signal input terminal 9 and to a voltage input terminal 6 for supplying the gate voltage, and the gates of the clip transistors M310-M330 and the gates of the control switches M410-M430 are commonly connected to a clip voltage input terminal VCLIP and to a control signal input terminal PSEL, and these gates are respectively supplied with signal voltages based on an operation timing described later. The sources of the load MOSs M51-M53 are connected to a common GND line 4, and the gates thereof are connected to the gate of the input MOS M50 and also connected to the voltage input terminal 5.

Further, the vertical signal line V1 is connected via a clamp capacitor CO1 and a transfer switch M21 to a capacitor CT1 for temporarily holding the signals, and is connected to an inverting terminal of an operational amplifier 10 in which a feedback capacitor CF and a reset switch MO are connected to a feedback system. The noninverting terminal of the operational amplifier 10 is connected to a reference voltage VREF. The terminal on the opposite side of the signal holding capacitor CT1 is grounded. A junction point of a clamp capacitor CO1 and a transfer switch M21 is connected via a clamp switch M31 to a clamp power source.

The gate of the horizontal transfer switch M41 is connected to the column selection line H1, and is connected to the horizontal scanning circuit block 7. The remaining columns V2-V3 shown in FIG. 7 are also provided with reading circuits having similar constructions. Further, the gates of the clamp switches M31-M33 connected to each of the columns, and the gates of the transfer switches M21-M23 are commonly connected to a clamp signal input terminal PCOR and to a transfer signal input terminal PT respectively, and respectively are supplied with signal voltages based on an operation timing which is described later.

Figure 8:
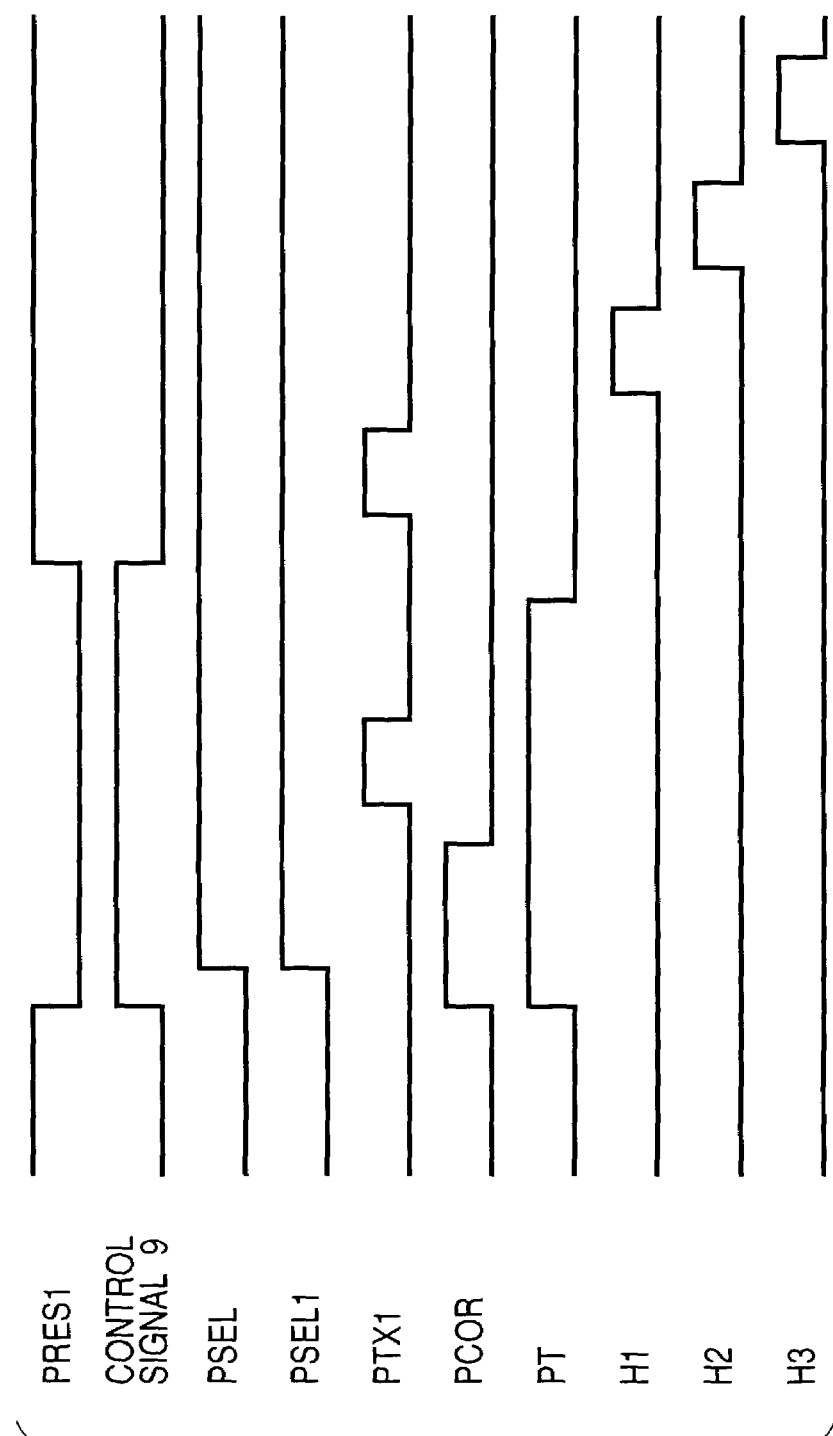
FIG. 8 is a timing chart for explaining operation of the sixth embodiment of the invention.

Next, explanation will be made of operation of the present embodiment, making reference to FIG. 8. When the photosignal charges in the photodiodes D11-D33 are to be read, the PRES1 connected to the gates of the reset MOSs M211-M231 changes to a high level. Accordingly, the gates of the amplification MOSs M311-M331 are reset by a reset power supply. When the PRES1 connected to the gates of the reset MOSs M211-M231 returns to the low level, simultaneously a gate control signal 9 for the reset MOSs M81-M83 changes to a high level, and after PCOR connected to the gates of the clamp switches M31-M33 changes to a high level, the PSEL1 connected to the gates of the selection MOSs M411-M431 and the clip control signal PSEL change to high level. Accordingly, the reset signals (the noise signals) with the reset noise superimposed thereon are read out to the vertical signal lines V1-V3 and clamped by the clamp capacitors C01-C03. Simultaneously, PT connected to the gates of the transfer switches M21-M23 changes to a high level, and the signal holding capacitors CT1-CT3 are reset by clamp voltages. Next, the PCOR connected to the gates of the clamp switches M31-M33 returns to a low level.

Next, the PTX1 connected to the gates of the transfer MOSs M111-M131 changes to a high level, and the photo-signal from the photodiodes D11-D33 are transferred to the gates of the amplification MOSs M311-M331 and the photosignals are simultaneously read out by the vertical signal lines V1-V3. When this occurs, the clip transistors M310-M330 are activated by control signals, so that when the gate voltages of the amplification MOSs M311-M331 are lower than the clip voltage VCLIP, the voltage of the vertical signal line is clipped by the voltage determined by the clip voltage VCLIP. Next, after the PTX1 connected to the gates of the transfer MOSs M111-M131 returns to a low level, the PT connected to the gates of the transfer switches M21-M23 changes to a low level. Accordingly, the amount of change from reset signal (the photo-signal) is read out to the signal holding capacitors CT1-CT3. At this point in the operation, the photo-signals from the pixel cells connected to the first row are held in the signal holding capacitors CT1-CT3 connected to the columns respectively.

Next, the PRES1 connected to the gates of the reset MOSs M211-M231 and the PTX1 connected to the gates of the transfer MOSs M111-M131 change to high level and the gate control signal 9 for the switches M81-M83 changes to a low level, and thus the photo-signal charges of the photodiodes D11-D33 are reset. After that, the signals H1-H3 from the horizontal scanning circuit block cause the gates of the horizontal transfer switches M41-M46 of each column to change to high level sequentially, and the voltages being held in the signal holding capacitors CT1-CT3 are read out sequentially to the feedback capacitor CF of the operational amplifier, and are outputted sequentially through an output terminal OUT. In the interval between respective readings of the signals of the columns, the electric charge of the feedback capacitor CF is reset by the reset switch MO. Thus, the reading of the pixel cells connected to the first row is completed. The subsequent operation is similar, such that the signals from the pixel cells connected to the second and subsequent rows are read out sequentially due to the signals from the vertical scanning circuit block, and thus the reading of all the pixel cells is completed.

For example, when the first row is read out in the above-mentioned operation, even if there are changes in the signal voltages read out to the vertical signal lines V1-V3, the drain voltages of the load MOSs M51-M53 do not change since they are determined by the source voltages of the gate-grounded MOSs M71-M73. Further, the drain voltages of the gate-grounded MOSs M71-M73 do not turn off since they are clipped by the clip transistors M310-M330. Therefore, even in a case where extremely large signal charges are read out, the electric current values of the load MOSs M51-M53 can be maintained with little change. Therefore, since neither the number of pixels into which light has entered nor the amount of incident light causes a change in the voltage drop amount of the GND line 4, the set currents of the load MOSs M51-M53 are maintained at their fixed levels regardless of which line is being read.

In accordance with the above-mentioned construction, output voltages from dark pixels (and from OB pixels) are equal between a row which includes pixels into which intense light enters and a row which does not, and thus a problem of a whitish strip occurring in an image upon which a strong spot light is made incident does not occur, thereby enabling a clear image to be obtained.

In the present embodiment, there is provided the switches M81-M83 for separating the vertical signal line V1 from the load, but a similar effect is also produced in a construction in which the voltage 6 that is inputted to the gates of the gate-grounded MOSs M71-M73 is caused to pulse between the gate-grounded voltage and the ground level.

Seventh Embodiment

Figure 9:
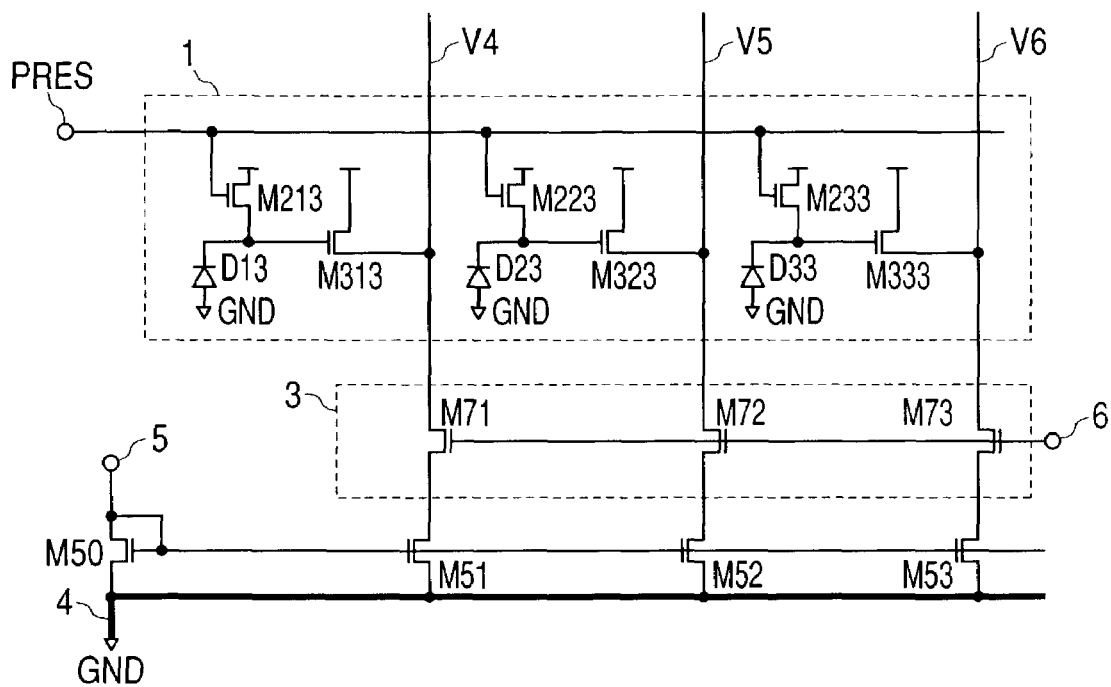
FIG. 9 is a block diagram of a solid-state image pickup apparatus illustrating a seventh embodiment of the invention.

FIG. 9 is a block diagram of a seventh embodiment of the solid-state image pickup apparatus according to the present invention. In accordance with the present embodiment, the pixel portion 1 is configured as a one-dimensional line sensor. The construction of the pixel portion 1 is different from the first embodiment in that there is no selection MOS for selecting the row, and the drains of the amplification MOSs M311-M331 are directly connected to the power source. When the light enters the photodiodes D11-D33, the photo-signal charges are generated and accumulated and are simultaneously outputted to output lines V4-V6 of the amplification MOSs M313-M333. Then, the PRES connected to the gates of the reset MOSs M213-M233 changes to a high level, and the electric charges accumulated in the photodiodes D11-D33 are reset.

In the above-mentioned operation, even if there are changes in the signal voltages read out to the vertical signal lines V4-V6, the drain voltages of the load MOSs M51-M53 do not change since they are determined by the source voltages of the gate-grounded MOSs M71-M73. Therefore, even in a case where extremely large signal charges are read out, the electric current values of the load MOSs M51-M53 can be maintained with little change. Therefore, since neither the number of pixels into which light enters nor the amount of incident light causes a change in the voltage drop amount of the GND line 4, the set currents of the load MOSs M51-M53 are maintained at their fixed levels regardless of which line is being read.

In accordance with the above configuration, the output voltages from dark pixels (and from OB pixels) do not change depending on the number of pixels that receive strong light. Therefore, it is not necessary to provide a circuit for clamping the OB at a later stage, and thus the circuitry becomes simple.

In the solid-state image pickup apparatus explained in the first to seventh embodiments above, a configuration may be adopted such that a given voltage V6 is applied to the gates of the gate-grounded MOSs M71-M73 during the period when the signals from the amplification MOSs inside the pixel cells are being read out by the vertical output lines V1-V3, and during the other time period, a voltage 6' which is smaller than the voltage 6 is applied to the gates of the gate-grounded MOSs M71-M73, or the gates of the gate-grounded MOSs M71-M73 is connected to a ground (GND). Alternatively, a constant voltage 6 may be applied during not only the period when the signals are being read out from the amplification MOSs in the pixel cells by the vertical output lines V1-V3 but also the period when the signals are not being read out.

In the former case, the voltages are applied to the gates of the gate-grounded MOSs M71-M73 only when necessary. Therefore, power consumption is reduced.

Further, in the latter case, the applied voltages do not have to be switched. Therefore, the circuitry has a simple construction.

The solid-state image pickup apparatus explained in the above first to seventh embodiments may be one which has an OB pixel or one which does not have an OB pixel.

Eighth Embodiment

Figure 10:
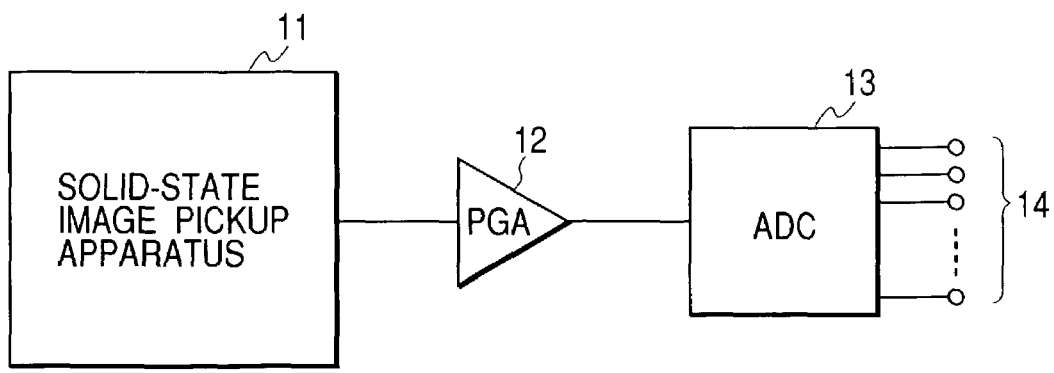
FIG. 10 is a block diagram of an image pickup system illustrating an eighth embodiment of the invention.

FIG. 10 is a block diagram of an image pickup system using the solid-state image pickup apparatus according to any one of the first to seventh embodiments explained above. Reference numeral 11 denotes the solid-state image pickup apparatus, reference numeral 12 denotes a programmable gain amp (PGA) for controlling amplitude of output signals from the solid- state image pickup apparatus, reference numeral 13 denotes an AD convener (ADC), and reference numeral 14 denotes digital outputs. In the case where the solid-state image pickup apparatus explained above is used, there is no variation among the outputs of horizontal OB pixels between a line which includes pixels into which strong light enters and a line which does not. Therefore, it is not necessary to clamp the horizontal OBs, and thus a DC direct connection can be made as shown in FIG. 10. Accordingly, horizontal lines and the like on an obtained image, caused by inconsistency between the horizontal OB clamp levels of rows, do not occur, and thus a high quality image pickup system with high image quality can be constructed with a simple block construction.

Ninth Embodiment

Figure 11:
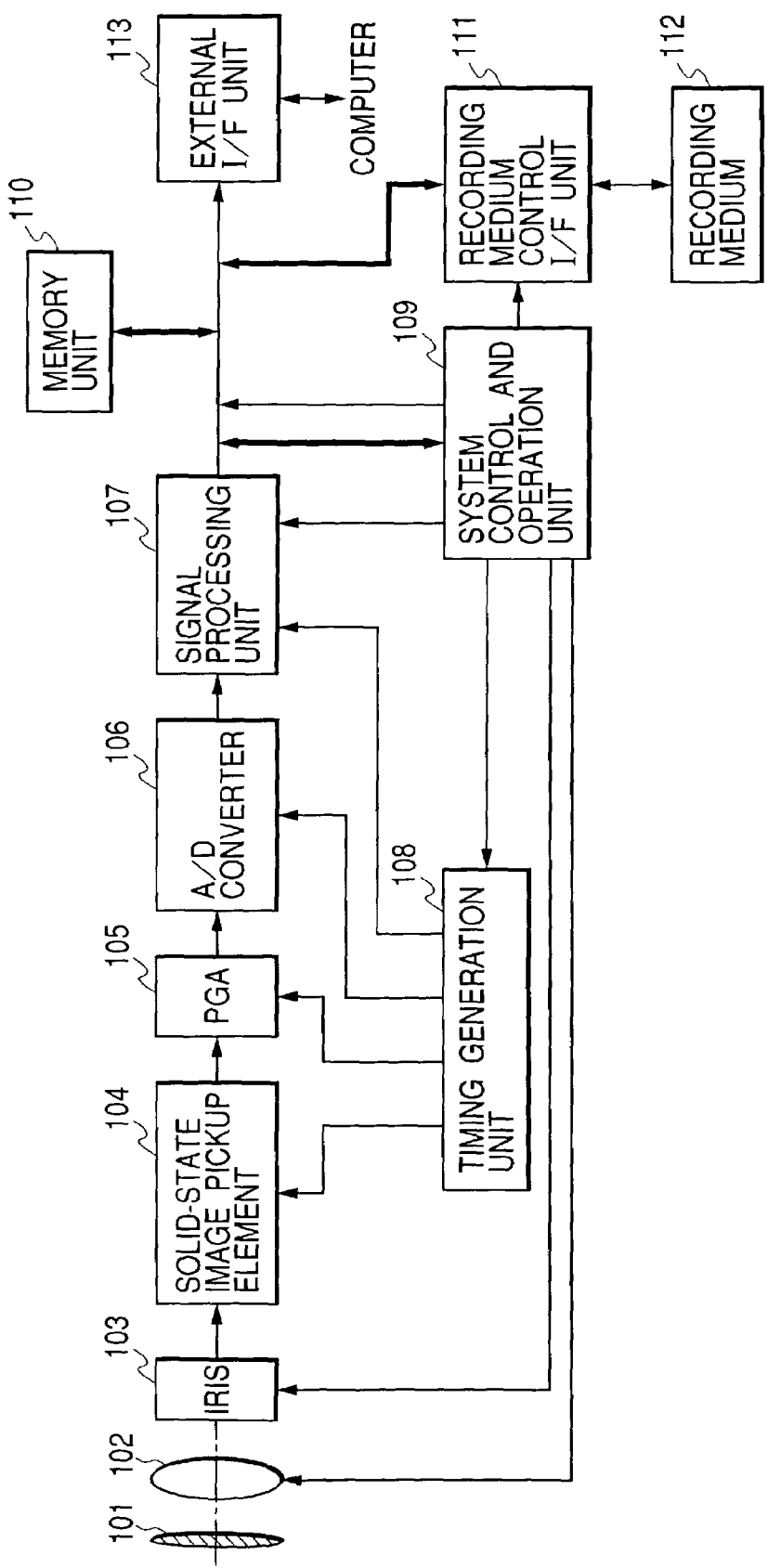
FIG. 11 is a block diagram of an image pickup system illustrating a ninth embodiment of the invention.
Figure 12:
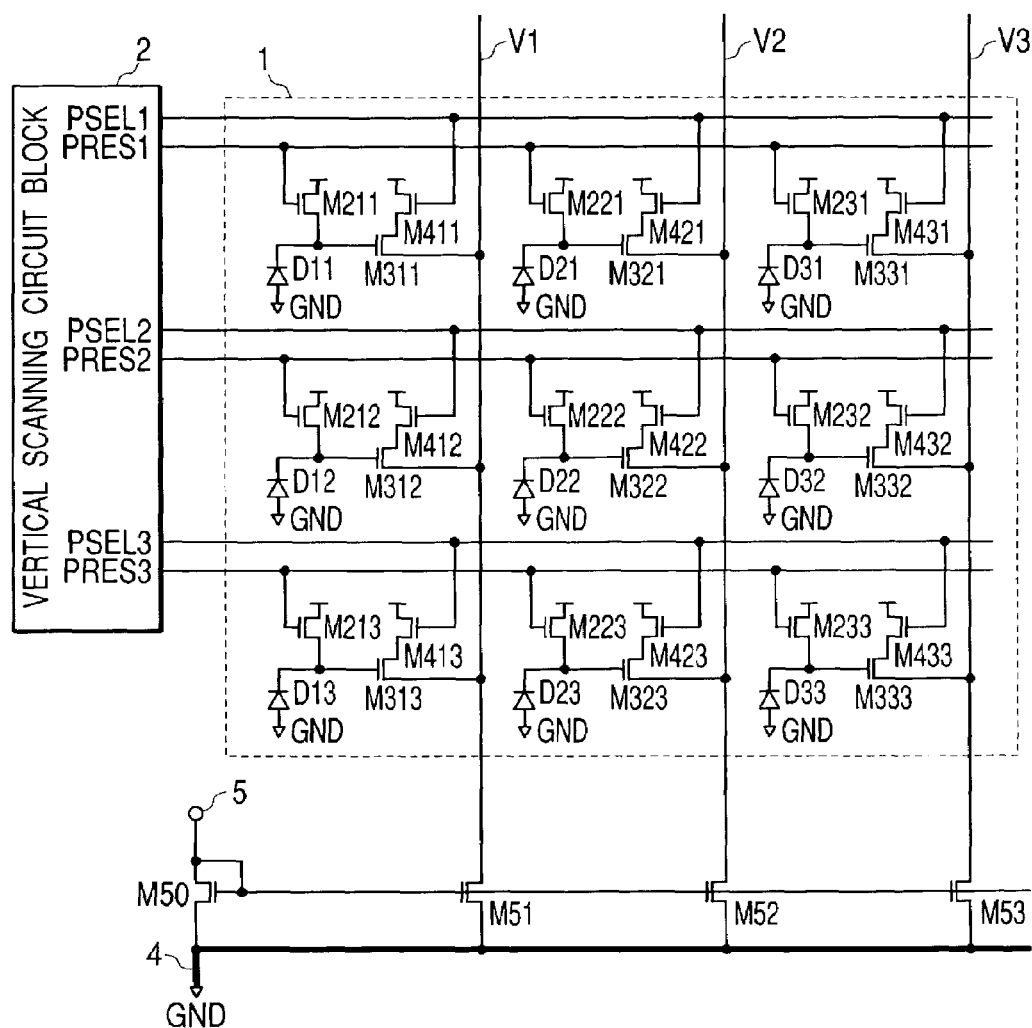
FIG. 12 is a diagram representing the conventional art.

FIG. 11 is a block diagram showing a case where the solid-state image pickup apparatus according to any one of the above-mentioned first to seventh embodiments is applied in an image pickup system (a still video camera). Reference numeral 101 denotes a barrier serving as both a lens protector and a main switch, reference numeral 102 denotes a lens for imaging an optical image of a photographed object onto a solid-state image pickup element 104, reference numeral 103 denotes an iris for enabling adjustment of the amount of light passing through the lens 102, reference numeral 104 denotes the solid-state image pickup apparatus for picking up as an image signal the photographed object imaged by the lens 102, reference numeral 106 denotes an A/D converter for performing analog/digital conversion of the image signal outputted via an image-pickup-signal processing circuit 105 for performing a gain correction and the like, and reference numeral 107 denotes a signal processing unit for performing various corrections on the image data outputted from the A/D converter 106 and for compressing the data. Further, reference numeral 108 denotes a timing generation unit for outputting various timing signals to the solid-state image pickup element 104, the image-pickup-signal processing circuit 105, the A/D converter 106 and the signal processing unit 107, reference numeral 109 denotes a system control and operation unit for performing various arithmetic operations and for controlling the still video camera as a whole, reference numeral 110 denotes a memory unit for temporarily storing the image data, reference numeral 111 denotes an interface unit for performing recording and reading to/from a recording medium, reference numeral 112 denotes a removable recording medium such as a semiconductor memory or the like for recording and reading the image data, and reference numeral 113 denotes an interface unit for communicating with an external computer or the like.

Next, explanation will be made regarding operation of the image pickup system at a time of capturing an image in accordance with the construction described above.

When the barrier 101 is opened, a main power supply turns on, then the power supply for the control system turns on, and also the power supply for the image-pickup system circuitry such as the A/D converter 106 turns on.

Then, in order to control the amount of light exposure, the system control and operation unit 109 opens the iris 103, and after the signal outputted from the solid-state image pickup element 104 is converted by the A/D converter 106, it is inputted to the signal processing unit 107. Based on this data, exposure operation is executed by the control system and operation unit 109.

Brightness is judged based on a result of a light measurement, and the control system and operation unit 109 controls the iris according to the result of the brightness judgment.

Next, high-frequency components are extracted based on the signal outputted from the solid-state image pickup element 104, and the control system and operation unit 109 executes an operation to calculate the distance to the photographed object. After that, the lens is driven and a judgment is made whether or not the lens is in focus. If the lens is judged as not in focus, the lens is driven again to measure the distance.

Then, after the focus is confirmed, the main exposure begins. When the main exposure is completed, the image signal outputted from the solid-state image pickup element 104 undergoes A-D conversion by the A/D converter 106 and then it passes through the signal processing unit 107 to be written to the memory unit by the control system and operation unit 109. After that, controls performed by the control system and operation unit 109 cause the data stored in the memory unit 110 to pass through a recording medium control I/F unit to be stored in the semiconductor memory or other such removable recording medium 112. The recorded data may also pass through the external I/F 113 and be inputted directly to the computer for image processing.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:
a pixel including a photoelectric conversion element and an amplification element arranged to amplify and output a signal generated at said photoelectric conversion element;
a load transistor arranged to supply an electric current flowing at said amplification element; and
a voltage control element arranged to suppress voltage fluctuation at a time when the electric current is flowing at said amplification element in a first main electrode of said load transistor which is an output side of said amplification element.

2. An image pickup apparatus according to claim 1, wherein said voltage control element is a control transistor connected serially to the first main electrode.

3. An image pickup apparatus according to claim 2, further comprising a drive circuit arranged to apply a constant first voltage to a control electrode of said control transistor both during a period when the signal from said amplification element is being read and during a period when the signal from said amplification element is not being read.

4. An image pickup apparatus according to claim 2, further comprising a drive circuit arranged to apply a constant first voltage to a control electrode of said control transistor during a period when the signal from said amplification element is being read out, and apply a voltage lower than the first voltage to the control electrode of said control transistor or apply a ground level during a period when the signal from said amplification element is not being read out.

5. An image pickup apparatus according to claim 2, further comprising a signal line for reading out the signal amplified by said amplification element, wherein said voltage control element has one main electrode connected to the first main electrode of said load transistor and has the other main electrode connected to said signal line.

6. An image pickup apparatus according to claim 1, wherein said voltage control element is a gate-grounded transistor connected serially to the first main electrode.

7. An image pickup apparatus comprising:
a pixel including a photoelectric conversion element and an amplification element arranged to amplify and output a signal generated at said photoelectric conversion element;
a load transistor arranged to supply an electric current flowing at said amplification element; and
a voltage control element arranged to suppress voltage fluctuation in a first main electrode of said load transistor which is an output side of said amplification element,
wherein said voltage control element receives electrical power and is turned on while suppressing voltage fluctuation in the first main electrode.

8. An image pickup apparatus according to claim 7, wherein said voltage control element is a control transistor connected serially to the first main electrode.

9. An image pickup apparatus according to claim 8, further comprising a drive circuit arranged to apply a constant first voltage to a control electrode of said control transistor both during a period when the signal from said amplification element is being read and during a period when the signal from said amplification element is not being read.

10. An image pickup apparatus according to claim 8, further comprising a drive circuit arranged to apply a constant first voltage to a control electrode of said control transistor during a period when the signal from said amplification element is being read out, and apply a voltage lower than the first voltage to the control electrode of said control transistor or apply a ground level during a period when the signal from said amplification element is not being read out.

11. An image pickup apparatus according to claim 7, wherein said voltage control element is a gate-grounded transistor connected serially to the first main electrode.

12. An image pickup apparatus according to claim 7, further comprising a signal line for reading out the signal amplified by said amplification element, wherein said voltage control element has one main electrode connected to the first main electrode of said load transistor and has the other main electrode connected to said signal line.

* * * * *

UNITED STATES PATENT AND TRADEMARK OFFICE
CERTIFICATE OF CORRECTION

| | | |
|---|---|---|
| PATENT NO. | : 7,355,645 B2 | Page 1 of 1 |
| APPLICATION NO. | : 10/190713 | |
| DATED | : April 8, 2008 | |
| INVENTOR(S) | : Katsuhito Sakurai et al. | |

It is certified that error appears in the above-identified patent and that said Letters Patent is hereby corrected as shown below:

COLUMN 2
Lines 22-35 ("On the other… MOSS becomes.") should be deleted.
Line 37, "pixels" should read --the pixels--.

COLUMN 4
Line 63, "When for example" should read --When, for example,--.

COLUMN 5
Line 28, "MOS Mill" should read --MOS M111--.

COLUMN 9
Line 53, "is" should read --are--.

Signed and Sealed this

Twenty-third Day of December, 2008

JON W. DUDAS
*Director of the United States Patent and Trademark Office*